Nov. 4, 1969
A. GOETZ
3,475,951
DEVICE AND PROCESS FOR COLLECTING PARTICULATES FROM GASES
Filed May 18, 1965
2 Sheets-Sheet 1
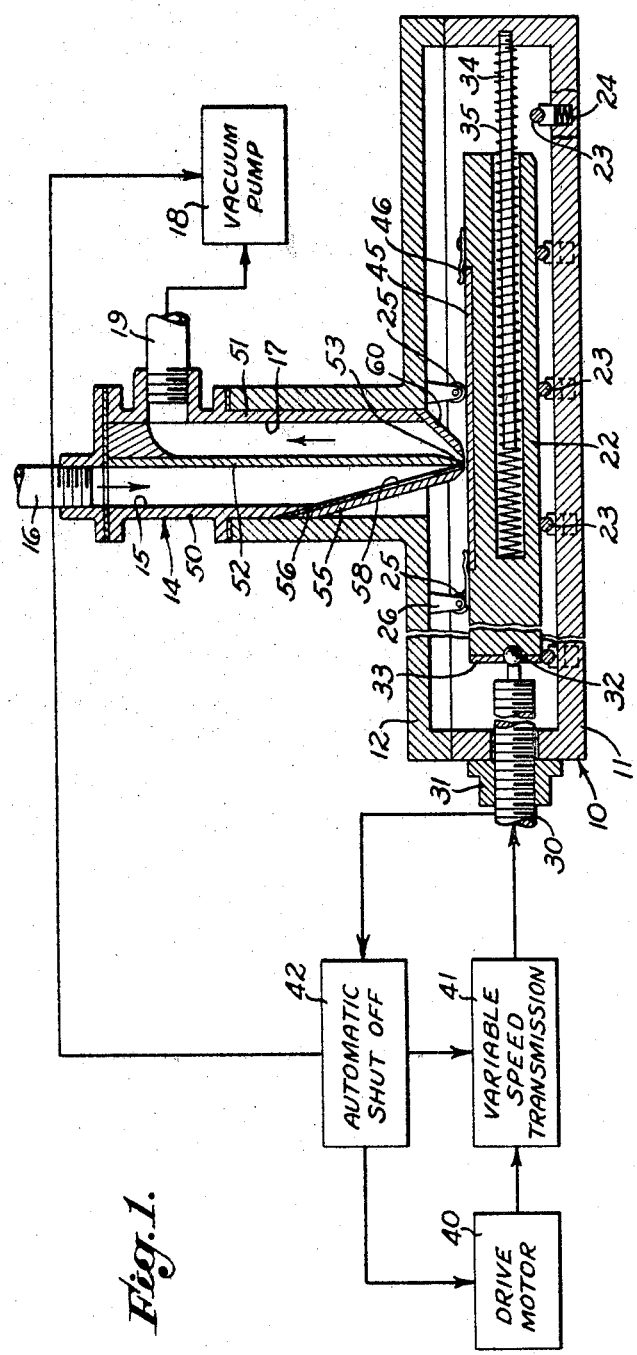
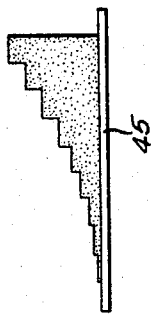
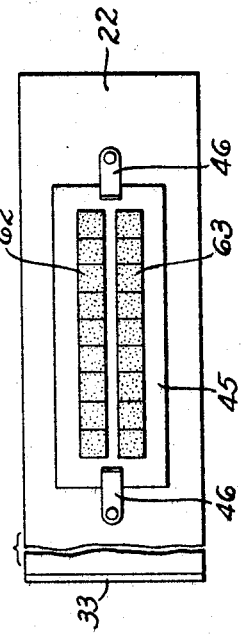
INVENTOR.
ALEXANDER GOETZ
BY HIS ATTORNEYS.
HARRIS, KIECH, RUSSELL & KERN Nov. 4, 1969 A. GOETZ 3,475,951
DEVICE AND PROCESS FOR COLLECTING PARTICULATES FROM GASES
Filed May 18, 1965 2 Sheets-Sheet 2
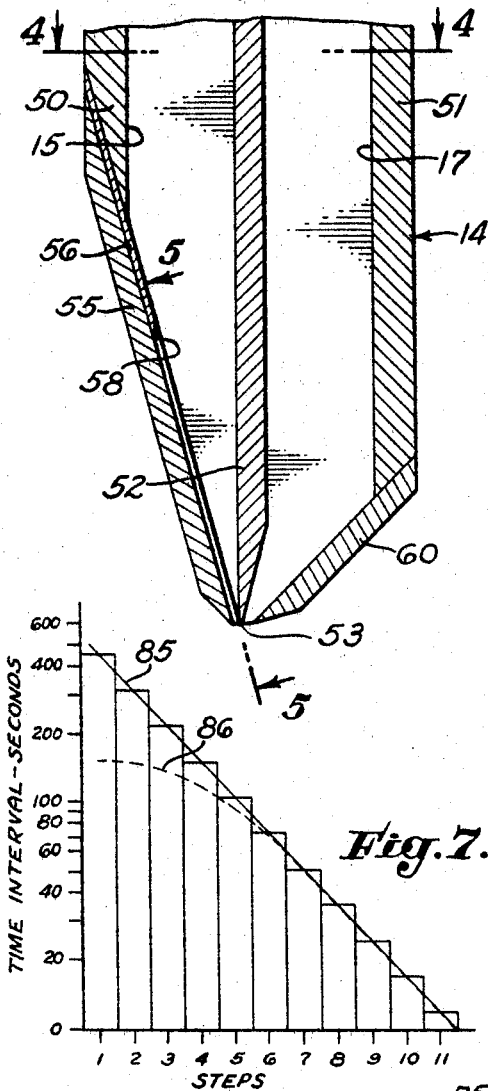
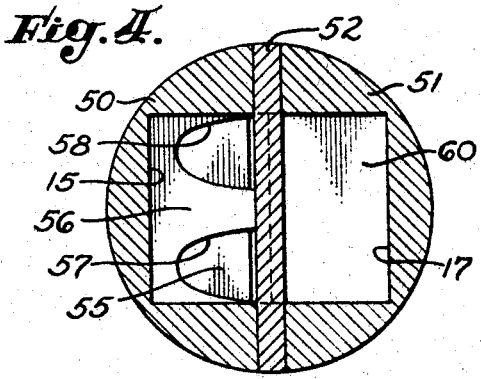
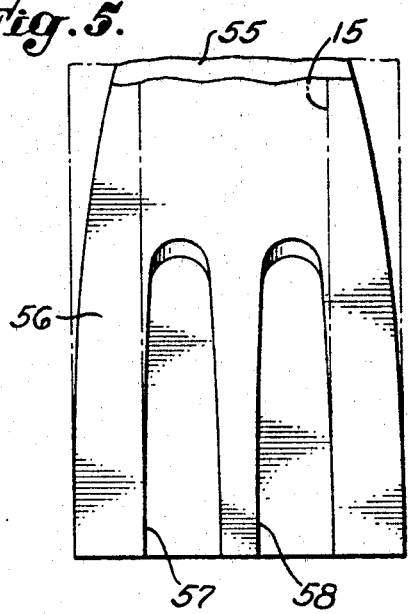
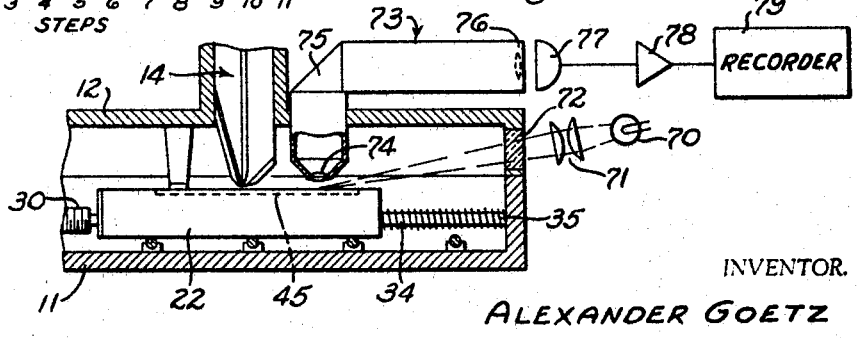
INVENTOR.
ALEXANDER GOETZ
BY HIS ATTORNEYS.
HARRIS, KIECH, RUSSELL & KERN United States Patent Office 3,475,951
Patented Nov. 4, 1969

3,475,951
DEVICE AND PROCESS FOR COLLECTING PARTICULATES FROM GASES
Alexander Goetz, Altadena, Calif., assignor to California Institute Research Foundation, Pasadena, Calif., a corporation of California
Filed May 18, 1965, Ser. No. 456,650
Int. Cl. G01n 31/20
U.S. Cl. 73—28                                                    14 Claims

ABSTRACT OF THE DISCLOSURE

Method and apparatus for collecting submicron size particles, including an impaction nozzle and collecting plate, the nozzle providing parallel gas flow paths toward and away from the plate, with a 180° turn about a knife edge at the plate, a nozzle inlet passage of continuously decreasing cross section providing continuous and uniform gas acceleration, a double slit nozzle, and a collection plate drive for moving the plate in steps of varying velocity with each step of a substantially constant velocity.

---

This invention relates to the collection and analysis of the particulate content of defined volumes of gaseous samples and to new and improved methods and apparatus for such collection and analysis. The invention is particularly adapted for use with particulates of submicron diameter, of a size less than that of dust. The invention is also particularly adapted for use with samples having a particle concentration less than that which can be measured by scattered light photometry of airborne particulates. Specifically the invention may be used with samples where the particulate mass concentration is in the order of less than a $10^{-7}$ fraction of the mass of the supporting gas phase, i.e., concentrations so low that chemical tracing methods become ineffective.

It is an object of the invention to provide a new and improved method and apparatus for collecting particles from gaseous samples wherein the particulates are of very small size and are present in very low concentrations. A further object is to provide such methods and apparatus which will isolate particulates without harming the sample. An additional object is to provide such methods and apparatus which can be used for obtaining samples to be subsequently treated as by physical and chemical methods of substance analysis.

It is a particular object of the invention to provide new and improved methods and apparatus which are suitable for routine surveys of particulate concentration in gases, such as atmospheric samples. A further object is to provide such methods and apparatus which do not require highly skilled operators or sensitive or complex analysis systems. An additional object is to provide such methods and apparatus which will yield information on the particulate concentration, the particulate size and the particulate composition. A specific object of the invention is to provide such methods and apparatus which are operative in concentration ranges down to 10 particles per liter.

It is an object of the invention to provide methods and apparatus wherein particulates are collected by impaction on a collection surface. A further object is to provide methods and apparatus wherein impaction is produced by directing the gas at a high velocity toward and away from the collection surface, moving the stream through a slit and around a knife edge at the surface. An additional object is to provide methods and apparatus wherein the collection surface is moved relative to the slit to provide a controlled sample deposition. The relative movement may be continuous or stepwise and may be manual or automatically produced.

It is an object of the invention to provide new and improved methods and apparatus for handling the deposited samples. A particular object is to provide a dark field illumination system whereby particulate concentration is determined by light scattering measurements which may be visually inspected, photographed, automatically scanned and countered, or optically measured to provide the desired record. An additional object is to provide new and improved methods and apparatus for performing reactions with the particulates or materials carried by the particulates, providing additional information regarding the constitution of the sample.

It is an object of the invention to provide an apparatus for depositing particulates from a gas on a collection surface, including a closed housing, plate means positioned within the housing and supporting the collection surface, nozzle means mounted in the housing and having an inlet passage and an outlet passage for flow of gas into and out of the housing with the inlet passage terminating in a slit and with the nozzle means including a knife edge separating the inlet and outlet passages and with the knife edge spaced from the collection surface defining a nozzle-plate passage, means for moving the sample gas through the inlet, nozzle-plate, and outlet passages, and means for effecting relative movement between the nozzle means and the plate means along a path substantially perpendicular to the inlet passage. An additional object is to provide new and improved nozzle construction including means for controlling and adjusting the slit size and the knife edge-collection surface spacing. A particular object is to provide an apparatus wherein the gas flow is provided by a suction or vacuum system at the outlet side. Another object is to provide such an apparatus suited to the depositing of particulates from a sample gas on a collection surface with the inlet passage slit and the knife edge-collection surface space being about the same size and with the outlet passage being substantially larger to provide a uniform non-turbulent flow pattern so as to produce minimum disturbance of the particulates in the sample.

It is an object of the invention to provide a method of collecting particulates from a gas including the steps of moving a stream of the gas at a controlled high velocity toward and away from a surface by providing a sharp reversal in flow direction at the surface to impact particulates carried by the gas onto the surface in a defined area, and effecting relative movement between the stream and the surface in a direction substantially perpendicular to the incoming gas flow to scan the impact area over the surface forming an impaction particulate deposit. Another object is to effect such relative movement stepwise or at a varying velocity to obtain particulate deposits of varying density. A particular object is to provide any such method wherein the particulates from the sample are collected on a polished opaque surface which is then illuminated at a low angle of incidence to provide only scattered light at a high angle of incidence with the deposited particulates producing the light scattering such that the scattered light intensity is a measure of the particulate concentration. A futher object is to provide a method wherein the particulates are collected in a gelatinous coating which may contain a reagent, with the particulates and/or material carried by the particulates reacting with a reagent in the coating or a reagent subsequently applied to attain selective retention of samples for identification purposes.

The invention also comprises novel details of construction and novel combinations and arrangements of parts and steps, which will more fully appear in the course of the following description. The drawings merely show and the description merely describes preferred embodiments of the present invention which are given by way of illustration or example.

In the drawings:

FIG. 1 is a sectional view of a preferred embodiment of the invention;

FIG. 1a is a side view of a sample plate, exaggerated in elevation;

FIG. 2 is a top view of the sample plate carrier of FIG. 1;

FIG. 3 is an enlarged sectional view of a portion of the nozzle of the instrument of FIG. 1;

FIG. 4 is a sectional view taken along the line 4—4 of FIG. 3;

FIG. 5 is a view taken along the line 5—5 of FIG. 3;

FIG. 6 is a view similar to that of FIG. 1 showing an alternative form of the instrument; and FIG. 7 is a graph illustrating a mode of operation of the invention.

The instrument of FIG. 1 includes a housing 10 having a lower member 11 and an upper member 12. The upper member is hinged or otherwise movable with respect to the lower member to permit access to the interior of the housing. The upper and lower members may be hermetically sealed together to provide an air-tight enclosure within the housing. A nozzle 14 is mounted in the upper member 12 and includes an inlet passage 15 connected to a sample source via a line 16 and an outlet passage 17 connected to a vacuum pump 18 via a line 19. A force pump could be used on the line 16 in place of the vacuum pump 18 but the suction system provided with the vacuum pump is preferred in that it provides a smoother gas flow pattern through the nozzle and also produces a minimum disturbance of the particulates in the sample gas. Also, the existence of the suction in the outlet passage 17 provides better control of the flow pattern over the nozzle knife edge as will be described hereinbelow.

A collection plate carriage 22 is mounted within the housing for movement in a direction generally perpendicular to the flow path of the inlet passage 15 of the nozzle 14. In the preferred embodiment illustrated, the carriage 22 rests on a plurality of rollers 23 which are urged upward by springs 24 to maintain the carriage in contact with spacer rollers 25 carried on brackets 26 depending from the upper housing member 12. With this construction, the spacing between the nozzle 14 and the carriage 22 can be precisely controlled.

Motion of the carriage 22 is produced by a lead screw 30 mounted in a threaded boss 31. A ball 32 at the inner end of the lead screw 30 is clamped in a mating socket in the carriage 22 by a clamp plate 33. A shaft 34 is fixed in a side wall of the lower housing member 11 and projects into an opening in the carriage 22 to serve as a guide for a spring 35 compressed between the carriage and the housing wall for eliminating end play in the coupling between the carriage and the lead screw 30. Of course, the nozzle could be moved with the plate remaining stationary, since it is the relative movement which is significant. The illustrated version is felt to be simpler and is preferred. The relative movement of the nozzle and carriage may be at a constant speed or at a varying speed and may be along either a straight line or a curvilinear path.

The lead screw 30 typically may be a micrometer type drive which can be actuated manually or by an electric motor or other suitable means to provide any desired rate of travel for the carriage in a continuous or a discontinuous or stepwise manner. In the preferred embodiment illustrated herein, the lead screw 30 is driven by a drive motor 40 through a variable speed transmission 41. The drive motor 40 and the vacuum pump 18 may be turned off by an automatic shutoff control 42. The shutoff control 42 may also be used to change the setting of the transmission 41 and to turn on the drive motor and vacuum pump thereafter. In a typical system, the automatic shutoff control may include a revolution counter which counts revolutions of the shaft 30 and initiates the control action after a predetermined number of revolutions have been produced by the drive motor. With this mode of operation, each stepwise advance of the carriage will be of equal length, with the duration of a particular step depending upon the setting of the transmission 41. Of course, the transmission could be continuously varied during the driving of the carriage but the stepwise operation is generally preferred, for reasons to be discussed below.

A collection plate 45 is mounted in a recess in the carriage 22 and may be held in place by spring clips 46. In a typical instrument for test purposes, the collection plate may be the size of a conventional microscope slide and in some instances, microscope slides may be utilized.

The construction of the nozzle 14 is shown in greater detail in FIGS. 3, 4, and 5. The inlet passage 15 may be formed in a semicylindrical member 50 and the outlet passage 17 similarly formed in another semicylindrical member 51. A divider plate 52 is positioned between the two semicylindrical members 50, 51 to form the main nozzle body. A knife edge 53 is provided at the lower end of the plate 52. The lower end of the inlet passage member 50 is cut on a shallow taper as seen in FIG. 3. The open lower end of the inlet passage 15 is closed by a plate 55 and a shim or spacer plate 56 which may be fastened to the member 50 by screws (not shown). Notches 57, 58 are provided in the spacer plate 56, with the notched-out portions of the spacer plate defining flow passages or slit areas between the divider plate 52 and the cover plate 55. The thickness of the spacer plate 56 controls the width of the exit slit of the inlet passage. Similarly, the width and number of the notches in the spacer plate 56 determines the length of the exit slit and the number of portions into which the exit slit is divided. The provision of the cover plate 55 at a shallow angle at the bottom of the inlet passage member 50 results in a continuously decreasing cross-sectional area for the inlet passage which produces a uniform and substantially non-turbulent increase in the velocity (i.e., acceleration) of the gas as it flows toward the slit.

The lower end of the outlet passage member 51 is partially closed by a plate 60 disposed at an angle with respect to the axis of the outlet passage 17. The inlet opening at the lower end of the outlet pasasge is considerably larger than that of the slit previously referred to.

The inlet passage 15 and the outlet passage 17 preferably are substantially parallel with each other as shown in FIG. 3 so that there is a sharp reversal in the gas flow path about the knife edge 53. The knife edge is spaced from the surface of the collection plate, preferably a distance corresponding to the width of the slit, so as to better preserve the flow path around the edge. The inlet opening of the outlet passage 17 is made considerably larger so that minimum impedance is introduced in the flow path at this area and so that the major portion of the incoming gas flow is withdrawn upward through the outlet passage.

In a typical instrument, the slit at the knife edge of the nozzle may be about $2 \times 10^{-2}$ cm. wide with each of the two portions about $4 \times 10^{-1}$ cm. in length. The knife edge 53 will be spaced from the surface of the collection plate about $2 \times 10^{-2}$ cm. The inlet opening of the outlet passage 17 will be about five to ten times as wide as the slit and will extend the full width of the passage 17.

The vacuum pump is operated to provide a relatively high gas flow velocity at the knife edge, preferably above .3 Mach. One instrument embodying the invention has been operated at about .4 Mach. Another has been operated at about .75 Mach. When the velocity at the edge is too low, the particulates in the gas will not be impacted on the collector plate but rather will be carried on with the gas stream. Higher gas velocities permit a shorter sampling time. The provision of the long taper in the inlet passage with the continuously decreasing cross section provides the desired high velocity at the edge with a minimum effect on the particulates in the sample. Impacts between particles with resultant modifications and impaction of particulates on the walls of the passage are substantially eliminated.

For a constant inflow of sample gas, the particulate deposit density on the collection plate is inversely proportional to the velocity of the plate carriage. Alteration of the ratio of the variable speed transmission 41 after each or after equal numbers of revolutions of the drive shaft 30 produces a sequence of uniform steps of deposits of different density, where the density ratio between the steps is defined by the transmission rates or ratios of the driving mechanism. This ratio is independent of the density and type of the particulate deposit. The resulting deposit pattern is shown in cross section with a greatly exaggerated vertical scale in FIG. 1a. The step-shaped deposit pattern produced by the stepwise discontinuous drive has an advantage over the continuously varied speed drive in that each step or plateau of the deposit should be of uniform density. This permits measurement at more than one point on a step permitting elimination of accidental contaminations and similar errors and also permits averaging of readings on several locations on a plateau.

If the transmission ratio between subsequent steps is varied by the same ratio, i.e., in exponential order, the ratio of the two particulate concentrations of otherwise similar constitution can be estimated by shifting the deposits relative to one another or by shifting the plots of measured density relative to one another, until steps of nearly equal appearance meet side by side. A typical instrument may have the capacity of ten adjacent steps embracing about a twenty-five fold density ratio.

The double notched spacer plate 56 of FIG. 5 produces two parallel deposits 62, 63 as shown in FIG. 2. With this arrangement, the two identical deposit strips can be treated and analyzed independently of each other as for example, the deposit density of one strip can be measured directly by one of the methods to be described and the other strip can be treated as for the extraction of organic components by application of a suitable solvent prior to measurement of deposit density.

If desired, the nozzle can be made with a plurality of separate inlet passages such as the passage 15, each connectible to a separate source and each leading separately to one of the exit slits whereby separate particle deposit strips of different gas systems may be formed simultaneosuly.

In one embodiment, the collection plate 45 is provided with a polished opaque upper surface upon which the particulates are deposited by impaction. Typically the polished opaque surface may be in the form of an electroplated chromium layer which is subsequently buffed and polished to a very smooth condition. In an alternate form, a layer of foil with a highly polished chromium surface may be mounted on a metal or glass plate. The significant characteristic of the polished opaque surface is that it neither reflects nor scatters any light at a higher angle such that it could reach into the aperture of an objective lens disposed normal to the surface; that is to say, the surface does not produce any light at a high angle of incidence when illuminated by a light beam at a low angle of incidence.

A sample deposit on the polished opaque surface may be evaluated under reflected low angle illumination in a microoptical system which is adjusted so as to produce a complete dark field of the surface in the absence of particles. The magnitude and variation of the light scattering as measured in such a system may be correlated with the deposit density providing a measure of the aerosol content of the gas sample.

In a typical arrangement, a beam of light may be directed onto the deposited particulates on the collection plate at an incident angle of about 20° and the area onto which the light is directed may be observed through an optical system perpendicular to the surface. Preferably the optical system will have a low aperture objective, e.g., 10 to 20× linear magnification. The objective lens will not see the incident light nor the light reflected by the polished surface in the absence of particles on the surface. Hence the field of the optical system will be dark. However, a particle deposited on the surface produces light scattering which is observed in the optical system. The number of points of scattered light observed and the intensity of the scattered light provide measures of the density of the deposit. The actual size of the lights observed provides a comparative measure of the size of the particulates. The scattered light may be observed visually, the light intensity may be measured photometrically, and the light density per unit area can be determined by counting directly and by photographing for subsequent counting.

An embodiment of the instrument of the invention particularly adapted for measurement and recording of scattered light intensity of the deposited particulates without disturbing the collection plate and without exposing the deposited samples to the atmosphere is illustrated in FIG. 6. Components corresponding to those of the instrument of FIG. 1 are identified by the same reference numerals.

A light source including a lamp 70 and a lens system 71 serves to direct a beam of light through a window 72 in the upper housing member 12 onto a zone on the collection plate 45 at an angle of incidence of about 20°. An optical system 73 is mounted in the upper housing member 12 and includes an objective lens 74 focused on the zone illuminated by the light beam. The optical system may include a prism 75 to provide a 90° bend so as to position the eye piece 76 at a convenient location for viewing. The illuminated zone may be viewed visually; alternatively, a photocell 77 may be positioned at the eye piece with the photocell output coupled via an amplifier 78 to a recorder 79. The recorder may be operated continuously to provide a continuous record of the scattered light intensity as the carriage is moved during the sampling operation. Alternatively, when a stepwise drive is being utilized, the recorder may be turned on for a period of time during each step to provide a short record for each step. The latter system normally will be preferred since the time intervals of the longer steps often exceed several minutes in duration. The optical system preferably is hermetically sealed at some point as at the prism or the objective lens in order to maintain the hermetic sealing of the interior of the housing. In order to obtain an earlier reading, half an objective could be used, permitting placement of the objective very close to the slit.

In another alternative embodiment, a gelatinous coating such as a layer of gelatin or agar may be provided on the collection plate with the particulates being impacted into the coating. A reagent may be suspended in the gelatinous coating for reaction with particulates or with material carried by particulates so as to provide an indication of the chemical composition of the aerosols or substances carried by the aerosols. As an example, a measurement of the sulfur trioxide in the gas sample may be determined by utilizing a coating of sulfur free agar with barium thiocyanate suspended therein. Sulfur trioxide brought into the coating by particulates will react to provide barium sulfate which is insoluble in water. After the collection process is completed, the collection plate is submerged in water, completing the reaction. The non-reacted particulates are floated off while the barium sulfate remains. The amount of barium sulfate on the collection plate may then be determined by the light scattering techniques described above. This collection and reaction technique may be used for a wide range of analyses, such as the Feigl spot tests.

As previously indicated, it is preferred to select the ratio of the exposure duration of sequential steps to provide an exponential or logarithmic change in duration and hence in deposit density. In any one case the ratio should remain constant and may be anywhere from 1:1 to 2:1 or even higher. The time interval or duration of each step for one such system is illustrated in the semilog graph of FIG. 7. In the illustrated example the increase in time and hence in deposit density for a uniform sample represents a ratio of 1.44:1.00 between adjacent steps, permitting handling of a wide range of sample densities. When plotted as a semilog diagram, the slope of the time interval and hence of the deposit density for a uniform sample is a straight line as indicated at 85. Hence a plot of scattered light intensity for a sample on a semilog basis should also be a straight line with the same slope.

The scattered light intensity of a deposit area is proportional to the particulate concentration thereon if the size distribution and particle substance is the same, that is, if the sample is uniform in nature, with the proviso that the deposited particles do not overlap or otherwise interfere with one another. Such interference may be mechanical such as where particles coalesce, may be optical in nature, or may have other bases. The onset of interference will be indicated by a gradual decrease in the measured scattered light intensity relative to the duration of the steps beyond a certain deposit density or step duration. A typical variation is shown in the curve 86 of FIG. 7 where the vertical ordinate is measured scattered light intensity plotted on a logarithmic scale. The higher the frequency of larger size particles in a sample or the higher the capacity for coalescence or other interfering characteristic, the earlier this deviation from a straight line will occur in terms of duration of a step. The measured scattered light intensity depends not only on the size and concentration of the particulates but also to a considerable degree upon their optical properties. While the deposit evaluation of a sample on the steps of lower duration will show intensity values which depend upon the optical properties of the particles, the optical properties do not affect the proportionally relation with the time interval.

Although exemplary embodiments of the invention have been disclosed and discussed, it will be understood that other applications of the invention are possible and that the embodiments disclosed may be subjected to various changes, modifications and substitutions without necessarily departing from the spirit of the invention and the specification.

I claim as my invention:

1. A method of determining particulate concentration in a gas, including the steps of:

moving a stream of the gas at a controlled velocity toward and away from a polished opaque surface by providing a sharp reversal in flow direction at the surface to impact particulates carried by the gas onto the surface in a defined area;

moving the surface at a varying velocity in a direction substantially perpendicular to the incoming gas flow to scan the impact area over the surface forming an impaction particulate deposit of varying density;

then illuminating the surface at a low angle of incidence producing substanitally no reflected light at a high angle of incidence except for light scattering from deposited particulates with the reflected scattered light intensity being a measure of the particulate concentration; and recording the reflected scattered light intensity at a series of locations along the surface.

2. A method of collecting particulates from a gas, including the steps of:

moving a stream of the gas at a controlled velocity toward and away from a surface by providing a sharp reversal in flow direction at the surface to impact particulates carried by the gas onto the surface in a defined area;

while the gas stream is moving from a point upstream of the surface to the surface, uniformly and continuously accelerating the gas; and effecting relative movement of the stream and the surface in a direction substantially perpendicular to the incoming gas flow to scan the impact area over the surface in steps with the duration of each step being a given ratio of the duration of the preceding step and with the movement being continuous at substantially constant velocity during a step, thus forming a series of impaction particulate deposits each of substantially uniform density.

3. A method of determining particulate concentration in a gas, including the steps of:

moving a stream of the gas at a controlled velocity toward and away from a surface by providing a sharp reversal in flow direction at the surface to impact particulates carried by the gas onto the surface in a defined area;

effecting relative movement of the stream and the surface in a direction substantially perpendicular to the incoming gas flow to scan the impact area over the surface in steps with the duration of each step being a given ratio of the duration of the preceding step, thus forming a series of impaction particulate deposits each of substantially uniform density;

then illuminating the surface at a low angle of incidence producing substantially no reflected light at a high angle of incidence except for light scattering from deposited particulates with the scattered light intensity being a measure of the particulate density;

recording the scattered light intensity for each step; and comparing the curve of scattered light intensity per step and the curve of step duration per step with a deviation between the curves at longer duration indicating particulate interference at increased density deposits.

4. A method of collecting particulates from a gas, including the steps of:

moving a stream of the gas at a controlled velocity toward and away from a surface by providing a sharp reversal in flow direction at the surface to impact particulates carried by the gas onto the surface in a defined area, with the surface carrying a gelatinous coating containing a reagent;

effecting relative movement between the stream and the surface in a direction substantially perpendicular to the incoming gas flow to scan the impact area over the surface forming an impaction particulate deposit in the coating; and then removing the coating leaving a reaction product on the surface.

5. In an apparatus for collecting particulates from a gas, the combination of:

a closed housing;

plate means positioned within said housing and having a collection surface;

nozzle means mounted in said housing and having an inlet passage and an outlet passage for flow of gas into and out of said housing, with said inlet passage terminating in a slit and, from a point upstream of the slit to the slit, having a uniformly and continuously decreasing cross sectional area, said nozzle means including a knife edge separating said inlet and outlet passages for gas flow thereacross from said inlet to said outlet passage, with said knife edge spaced from said surface defining a nozzle-plate passage;

means for moving a gas through said inlet, nozzle-plate, and outlet passages in sequence; and means relatively moving said nozzle means and said plate means along a path substantially perpendicular to said inlet passage.

6. An apparatus as defined in claim 5 including spacing means within said housing for maintaining a controlled space between said knife edge and said surface.

7. In an apparatus for collecting particulates from a gas, the combination of:
a closed housing;
plate means positioned within said housing and having a polished opaque impact surface;
nozzle means mounted in said housing and having an inlet passage and an outlet passage for flow of gas into and out of said housing, with the downstream portion of said inlet passage having a continously decreasing cross-sectional area terminating in a slit,
said nozzle means including a knife edge separating said inlet and outlet passages for gas flow thereacross from said inlet to said outlet passage, with said knife edge spaced from said surface defining a nozzle-plate passage of a width about the width of said slit;
means for moving a gas through said inlet, nozzle-plate, and outlet passages in sequence; and
means for moving said plate means along a path substantially perpendicular to said inlet passage in steps of varying velocity with each step of a substantially constant velocity.

8. In an apparatus for collecting particulates from a gas, the combination of:
a closed housing;
plate means positioned within said housing and having a polished opaque impact surface;
nozzle means mounted in said housing and having substantially parallel inlet and outlet passages for flow of gas into and out of said housing, with the downstream portion of said inlet passage having a continuously decreasing cross-sectional area terminating in a slit,
said nozzle means including a knife edge separating said inlet and outlet passages for gas flow thereacross from said inlet to said outlet passage, with said knife edge spaced from said surface defining a nozzle-plate passage of a width about the width of said slit, with the inlet opening of said outlet passage disposed adjacent said knife edge and being at least several times greater in cross-sectional area than said slit;
vacuum means connected to said outlet passage for sucking a gas through said inlet, nozzle-plate, and outlet passages;
spacing means mounted in said housing for maintaining a controlled space between said knife edge and said surface; and
means for moving said plate means along a path substantially perpendicular to said inlet passage in steps of varying velocity with each step of a substantially constant velocity.

9. In an apparatus for collecting particulates from a gas, the combination of:
a closed housing;
plate means positioned within said housing and having a collection surface;
nozzle means mounted in said housing and having an inlet passage means and an outlet passage means for flow of gas into and out of said housing, with said inlet passage means terminating in a slit having at least one intermediate closed portion and thus providing at least two spaced slit openings aligned end to end,
said nozzle means including a knife edge separating said inlet and outlet passage means for gas flow thereacross from said inlet passage means to said outlet passage means, with said knife edge spaced from said surface defining a nozzle-plate passage;
means for moving gas through each of said slit openings and then through said nozzle-plate passage and said outlet passage means in sequence; and
means for moving said plate means along a path substantially perpendicular to said inlet passage.

10. In an apparatus for collecting particulates from a gas, the combination of:
a closed housing;
plate means positioned within said housing and having a collection surface;
nozzle means mounted in said housing and having an inlet passage and an outlet passage for flow of gas into and out of said housing, said nozzle means including a knife edge separating said inlet and outlet passages for gas flow thereacross from said inlet to said outlet passage,
said nozzle means including a removable member of preselected thickness extending along said inlet passage toward said knife edge with said member having a notch defining a slit for gas flow from said inlet passage and, from a point upstream of the slit to the slit, with said inlet passage having a uniformly and continuously decreasing cross sectional area, and with said knife edge spaced from said surface defining a nozzle-plate passage adjacent said slit;
means for moving a gas through said inlet, nozzle-plate, and outlet passages; and
means for moving said plate means along a path substantially perpendicular to said inlet passage.

11. In an apparatus for collecting particulates from a gas, the combination of:
a closed housing;
plate means positioned within said housing and having a collection surface carrying a gelatinous coating containing a reagent;
nozzle means mounted in said housing and having an inlet passage and an outlet passage for flow of gas into and out of said housing, with said inlet passage terminating in a slit,
said nozzle means including a knife edge separating said inlet and outlet passages for gas flow thereacross from said inlet to said outlet passage, with said knife edge spaced from said coated surface defining a nozzle-plate passage;
means for moving a gas through said inlet, nozzle-plate, and outlet passages; and
means for relatively moving said plate means and said nozzle along a path substantially perpendicular to said inlet passage.

12. In an apparatus for determining particulate density in a gas, the combination of:
a closed housing;
plate means positioned within said housing and having a polished opaque impact surface;
nozzle means mounted in said housing and having an inlet passage and an outlet passage for flow of gas into and out of said housing, with said inlet passage terminating in a slit;
said nozzle means including a knife edge separating said inlet and outlet passages for gas flow thereacross from said inlet to said outlet passage, with said knife edge spaced from said surface defining a nozzle-plate passage;
means for moving a gas through said inlet, nozzle-plate, and outlet passages;
means for moving said plate means along a path substantially perpendicular to said inlet passage to move said surface past said slit;
illumination means for directing a beam of light onto said surface at a low angle of incidence at a location on said path beyond said slit; and
optical means mounted in said housing for viewing said surface at said location at a high angle of incidence.

13. An apparatus as defined in claim 12 including means for determining the intensity of the light passing through said optical means.

14. In an apparatus for collecting particulates from a gas, the combination of:
a closed housing;

plate means positioned within said housing and having a collection surface;

nozzle means mounted in said housing and having an inlet passage and an outlet passage for flow of gas into and out of said housing, with said passage terminating in a slit, said nozzle means including a knife edge separating said inlet and outlet passages for gas flow thereacross from said inlet to said outlet passage, with said knife edge spaced from said surface defining a nozzle-plate passage;

means for moving a gas through said inlet, nozzle-plate, and outlet passages;

translation means for moving said plate means along a path substantially perpendicular to said inlet passage to move said surface past said slit;

variable speed drive means for actuating said translation means to advance said plate means at a predetermined velocity; and control means for stopping said drive means after movement of said plate means a predetermined amount.

References Cited

UNITED STATES PATENTS

| 2,209,614 | 7/1940 | Rowley | 73—28 |
| 2,879,664 | 3/1959 | Tait | 73—28 |
| 3,127,763 | 4/1964 | Lippman | 73—28 |

FOREIGN PATENTS

| 659 | 1/1911 | Great Britain. |

OTHER REFERENCES

An article entitled "A Forward Angle Light Scattering Camera for Determining Size Distribution in Aerosols" in the Review of Scientific Instruments, vol. 25, No. 10, October 1954, pp. 1004–1010.

RICHARD C. QUEISSER, Primary Examiner

JOHN K. LUNSFORD, Assistant Examiner